UNITED STATES PATENT OFFICE.

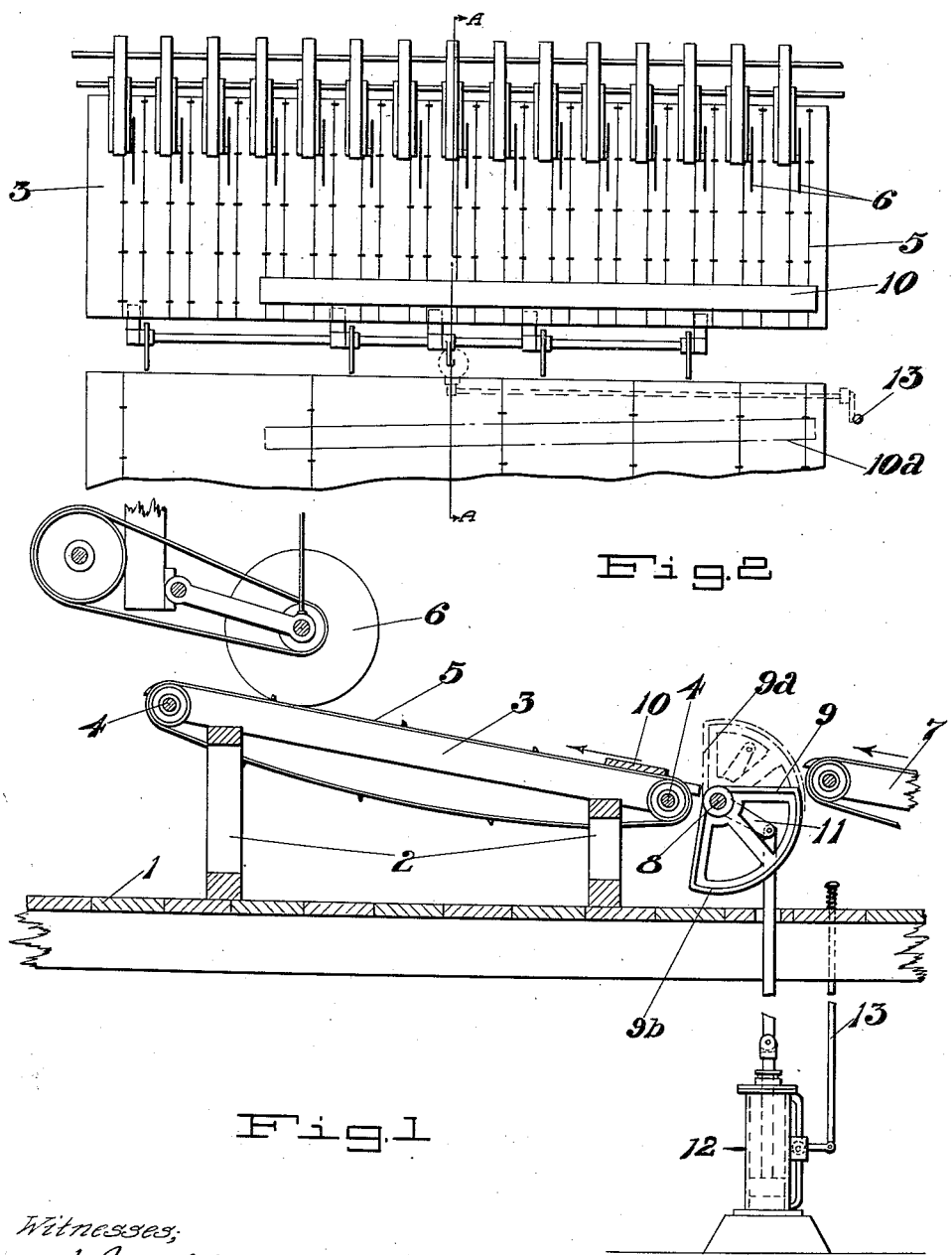

HENRY S. MITCHELL, OF WAUNA, OREGON.

LOADER FOR LUMBER-TRIMMERS.

1,246,138.  Specification of Letters Patent.  Patented Nov. 13, 1917.

Application filed January 30, 1914. Serial No. 815,537.

*To all whom it may concern:*

Be it known that I, HENRY S. MITCHELL, a citizen of the United States, residing at Wauna, in the county of Clatsop and State of Oregon, have invented certain new and useful Improvements in Loaders for Lumber-Trimmers, of which the following is a specification.

My invention pertains to loaders for lumber trimmers, and has for its object to provide a mechanical device which will receive lumber as it comes from the transfer in a mill and load it upon the trimmer table. A further object is to provide mechanism which will receive articles while in motion and invert them. A still further object is to provide mechanism to receive objects moving on a carrier, invert them and deliver them to a receiver.

These and other objects will appear from a description of the drawing, in which—

Figure 1 shows a longitudinal sectional view of a trimmer table and trimmer, with a transfer adjacent thereto and my improved loader disposed between, taken on the line A—A of Fig. 2.

Fig. 2 is a plan view showing the transfer, loader and the trimmer, in place.

Describing the drawing in detail, 1 designates a main frame upon which are placed the risers 2 for carrying the trimmer. This trimmer comprises the table 3 carrying a pulley shaft 4 at each end, over which travel conveyer belts 5, for carrying lumber loaded thereon.

Disposed at intervals across the trimmer table are saws 6, each mounted on a swinging frame and adapted to be swung into working position, in any well known manner.

At the right in Fig. 1 is shown a transfer or conveyer 7 which is constructed in the usual manner, and adapted to convey lumber from the saw to position for loading upon the trimmer table.

In the usual trimming operations the lumber is conveyed from the transfer by hand, over skids, onto the trimmer table, involving much difficult labor.

In my mechanical loader I have mounted a shaft 8 between the transfer and the trimmer, approximately in the same plane with the latter and closely adjacent the end thereof. This shaft extends the length of the trimmer table, and at intervals throughout its length is fixed an arm 9 whose length is such as to permit it to clear the transfer as the shaft is rotated. These arms are fixed in alinement and are adapted to be swung to the level of the transfer which is fixed in a plane somewhat above that of the adjacent end of the trimmer table. These arms will thus form means upon which the lumber can slide onto the table; or by a sudden movement of the arms to the position shown dotted at 9ª, the lumber may be inverted and dropped upon the table as at 10, whence it will be carried by the conveyers 5 to the saws 6.

Upon the shaft 8 is fixed a crank 11, which is operatively connected with the air or steam cylinder 12, and which is controlled through the foot lever 13.

As shown in Fig. 1 the arms 9 are made in the form of an eccentric segment with the shorter side uppermost, the eccentricity of the periphery increasing to the opposite side as at 9ᵇ. In operation, the articles brought by the transfer, will be delivered upon the loader.

The operator will determine which side of the article, such as a piece of lumber, it is desired to have uppermost. If the side presented is satisfactory, a properly controlled movement of the foot lever will raise the arms so that the article will slide onto the table without being turned over, but if it is determined that the lower side of the article should be placed uppermost, then a sudden movement of the arms to their upper limit will invert the article and load it upon the table.

In either case, as the segment arms rise above the level of the transfer, their eccentrically formed faces will act as a stop for the timber or other articles brought against them by the transfer; and should the articles become shifted from their parallelism to the end of the transfer as shown at 10ᵇ, the force of the conveyers against said arms will move them into alinement.

Upon restoring the segment arms to down position said arms will immediately be released from contact with articles on the transfer, with their initial movement, because of the longer arms of the segments being placed at the lower sides.

Having thus described my invention, what I claim, is—

1. In a device for moving flat lumber, in combination, two traveling conveyers mounted end to end at a space apart, means for driving them in the same direction, means for transferring and turning said lumber, piece by piece, from one conveyer to the other, said means comprising a shaft mounted between the ends of said conveyer, a plurality of segments mounted on said shaft at a space apart and having straight registering supporting upper edges adapted to receive said lumber from the end of one conveyer, and means for turning said shaft and said segments a partial turn to transfer and turn said lumber to the other conveyer, the curved portions of said segments moving upwardly in front of the delivering conveyer and operating as a stop, substantially as described.

2. In a device for moving flat lumber, in combination, two traveling conveyers mounted end to end at a space apart, means for driving them in the same direction, means for transferring and turning said lumber, piece by piece, from one conveyer to the other, said means comprising a shaft mounted between the ends of said conveyer, a plurality of eccentric segments mounted on said shaft at a space apart and having straight registering supporting upper edges adapted to receive said lumber from the end of one conveyer, and means for turning said shaft and said conveyer, the eccentrically curved portions of said segments moving upwardly in front of the delivering conveyer and operating to stop and move backwardly on the conveyer the next piece to be delivered, substantially as described.

In testimony whereof I affix my signature in the presence of two witnesses.

HENRY S. MITCHELL.

Witnesses:
E. EARL FEIKE,
HAZEL A. ARMSTRONG.